US008850496B2

(12) United States Patent
Baskaran et al.

(10) Patent No.: US 8,850,496 B2
(45) Date of Patent: Sep. 30, 2014

(54) DYNAMIC PROVISIONING OF CLOSED CAPTIONING TO USER DEVICES

(75) Inventors: Arjun Baskaran, Chennai (IN); Saurabh Gorecha, Ratlam (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 42 days.

(21) Appl. No.: 13/285,277

(22) Filed: Oct. 31, 2011

(65) Prior Publication Data

US 2013/0111528 A1 May 2, 2013

(51) Int. Cl.
  *H04N 7/18* (2006.01)
  *H04N 5/445* (2011.01)
  *H04N 7/173* (2011.01)
  *G04F 3/00* (2006.01)
  *G04F 13/00* (2006.01)

(52) U.S. Cl.
  USPC .............................. 725/82; 725/38; 725/136

(58) Field of Classification Search
  USPC ........................................................ 348/468
  See application file for complete search history.

(56) References Cited

U.S. PATENT DOCUMENTS

| | | | | |
|---|---|---|---|---|
| 2004/0237104 A1* | 11/2004 | Cooper et al. | ................... | 725/38 |
| 2005/0073608 A1* | 4/2005 | Stone et al. | ................... | 348/468 |
| 2006/0089987 A1* | 4/2006 | Igarashi et al. | ................ | 709/225 |
| 2007/0136777 A1* | 6/2007 | Hasek et al. | ................... | 725/114 |
| 2008/0086754 A1* | 4/2008 | Chen et al. | ..................... | 725/105 |
| 2008/0129864 A1* | 6/2008 | Stone et al. | .................... | 348/468 |
| 2008/0141303 A1* | 6/2008 | Walker et al. | ................... | 725/39 |
| 2008/0298777 A1* | 12/2008 | Jung et al. | ........................ | 386/95 |
| 2009/0158370 A1* | 6/2009 | Li et al. | .......................... | 725/110 |
| 2010/0216429 A1* | 8/2010 | Mahajan | ........................ | 455/411 |
| 2011/0023073 A1* | 1/2011 | McCarthy et al. | .............. | 725/98 |
| 2011/0119743 A1* | 5/2011 | Gleim et al. | ....................... | 726/6 |
| 2012/0011577 A1* | 1/2012 | Mashimo | ........................... | 726/7 |
| 2012/0243851 A1* | 9/2012 | Koreeda et al. | ............... | 386/252 |
| 2013/0179688 A1* | 7/2013 | Lee et al. | ....................... | 713/168 |

\* cited by examiner

*Primary Examiner* — Benjamin R Bruckart
*Assistant Examiner* — Akshay Doshi (57) ABSTRACT

A system is configured to receive, from a user device, a request for video content and closed captioning content associated with the video content; obtain, based on the request, device information that identifies a first video format that is supported by the user device; obtain the video content and the closed captioning content, where the video content conforms to a second video format, and where the closed captioning content conforms to a text format; convert the video content from the second video format to the first video format and the closed captioning content from the text format to the first video format; and transmit the converted video content and the converted closed captioning to the user device, where the converted video content and the converted closed captioning content enable the user device to play the converted video content and the converted closed captioning content without modifying the user device.

19 Claims, 6 Drawing Sheets

| DEVICE ID 405 | DEVICE TYPE 410 |
| CAPABILITIES 415 | NETWORK ADDRESS 420 |
| VIDEO FORMAT 425 | PROTOCOLS 430 |
| ... | ... |

DYNAMIC PROVISIONING OF CLOSED CAPTIONING TO USER DEVICES

BACKGROUND

User devices perform an increasing variety of tasks that allows users to make and receive calls, play video content, send and receive messages (e.g., emails, instant messages, etc.), surf the Internet, play games, make electronic purchases, perform social networking, etc.

The user devices can receive video content, from content providers, process the video content, and play the video content on the user devices. The user devices may receive video content that includes closed captioning content. One type of user device, such as a set top box, can receive the closed captioning content and can display the closed captioning content on a display device. Unfortunately, content providers transmit the closed captioning content in a format that cannot be processed and/or played on user devices other that set top boxes.

DETAILED DESCRIPTION OF PREFERRED EMBODIMENTS

The following detailed description refers to the accompanying drawings. The same reference numbers in different drawings may identify the same or similar elements.

A system and/or method, described herein, may allow a client device to receive video content and closed captioning content, associated with the video content, from a content provider. The system and/or method may allow the client device to provision the video content and the closed captioning content to user devices, other than a set top box. The system and/or method may allow the client device to convert the video content and/or the closed captioning content into a video format that is supported by the user device. The system and/or method may allow the client device to provision the formatted video content and/or closed captioning content to the user device using a protocol that is supported by the user device. Provisioning the formatted video content and/or closed captioning content, to the user device, may permit the user device to receive, process, and/or play the formatted video content and/or closed captioning content without modifying and/or replacing the user device and/or network hardware.

Figure 1:
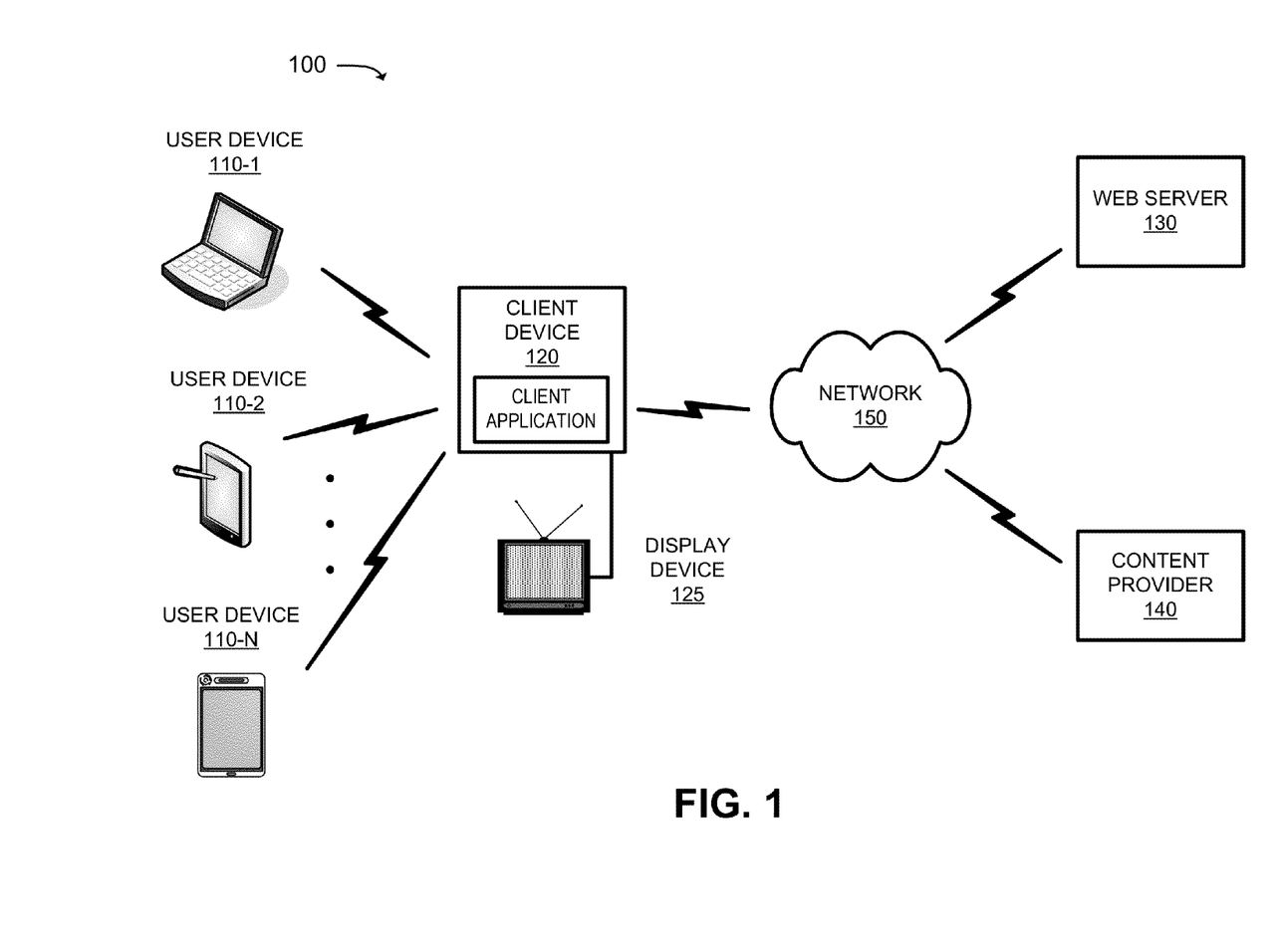
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of user devices 110-1, . . . , 110-N (where N≥1) (hereinafter referred to collectively as "user devices 110" and individually as "user device 110"), a client device 120, a display device 125, a web server 130, a content provider 140, and a network 150. The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

Also, in some implementations, one or more of the devices of environment 100 may perform one or more functions described as being performed by another one or more of the devices of environment 100. For example, client device 120 and display device 125 may be combined into a single device. Devices of environment 100 may interconnect via wired connections, wireless connections, or a combination of wired and wireless connections.

User device 110 may include any computation or communication device, such as a wireless mobile communication device that is capable of communicating with network 150. For example, user device 110 may include a desktop computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, a smart phone, or another type of computation or communication device that does not correspond to a set top box.

User device 110 may register with client device 120 so that user device 110 may receive video content and/or closed captioning content from client device 120. User device 110 may receive the video content and/or closed captioning content in a format and/or via a protocol that can be received, processed, and/or played on user device 110.

Client device 120 may include a device that can communicate with network 150 to receive and/or process video content and/or closed captioning content. In an example implementation, client device 120 may include a set top box, a computer, a server device, a digital video recorder, a cable card, or another type of device that includes a video tuner.

Client device 120 may communicate with content provider 140 to receive a video stream that includes video content. Client device 120 may process the video stream to obtain the video content and may present the video content for display on display device 125. Client device 120 may also, or alternatively, remove closed captioning content from the video stream and may present the closed captioning content for display on display device 125.

Client device 120 may register user device 110 that allows client device 110 to provision video content and/or closed captioning content to user device 110. Client device 120 may obtain, from user device 110, information that identifies one or more formats, protocols, data rates, etc., that are supported by user device 110, to receive, process, and/or play video content.

Client device 120 may process the video stream, received from content provider 140, to obtain the video content and/or closed captioning content from the video stream. Client device 120 may convert the video content and/or the closed captioning content to one of the identified formats that is supported by user device 110. Client device 120 may transmit, to user device 110, the formatted video content and/or the closed captioning content, using one of the identified protocols that allows user device 110 to receive, process, and/or play the video content and/or the closed captioning content.

Display device 125 may include one or more devices capable of receiving, processing and/or displaying video and/or audio signals, associated with video content, received from client device 120. In one example implementation, display device 125 may take the form of a television. In another implementation, display device 125 may include a computer monitor.

Web server 130 may include one or more server devices, or other types of computation or communication devices, that gather, process, search, store, and/or provide information in a manner described herein. In an example implementation, web server 130 may be a web server that hosts a web site and/or provisions web services to a client application of client device 120. For example, web server 130 may, in response to a request from client device 120, provide information, associated with user device 110, to client device 120. Additionally, or alternatively, web server 130 may, in response to a request from client device 120, provide closed captioning content and/or video content to client device 120.

Content provider 140 may include any type or form of content provider. For example, content provider 140 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 140 may produce media streams (e.g., television broadcasts). A "media stream," as used herein, may refer to stream of content that includes video content (e.g., a video stream), audio content (e.g., an audio stream), and/or textual content (e.g., a textual stream).

Network 150 may include a single network or multiple networks. For example, network 150 may include a video signaling and distribution network, such as a fiber optic-based network (e.g., a fiber optic service network), that distributes information and/or television content to client device 120. Additionally, or alternatively, network 150 may include one or more wired and/or wireless networks. For example, network 150 may include a cellular network, the Public Land Mobile Network (PLMN), a second generation (2G) network, a third generation (3G) network, a fourth generation (4G) network, a fifth generation (5G) network, and/or another network (e.g., a long term evolution (LTE) network). Additionally, or alternatively, network 150 may include a wide area network (WAN), a metropolitan area network (MAN), an ad hoc network, an intranet, the Internet, and/or a combination of these or other types of networks.

Figure 2:
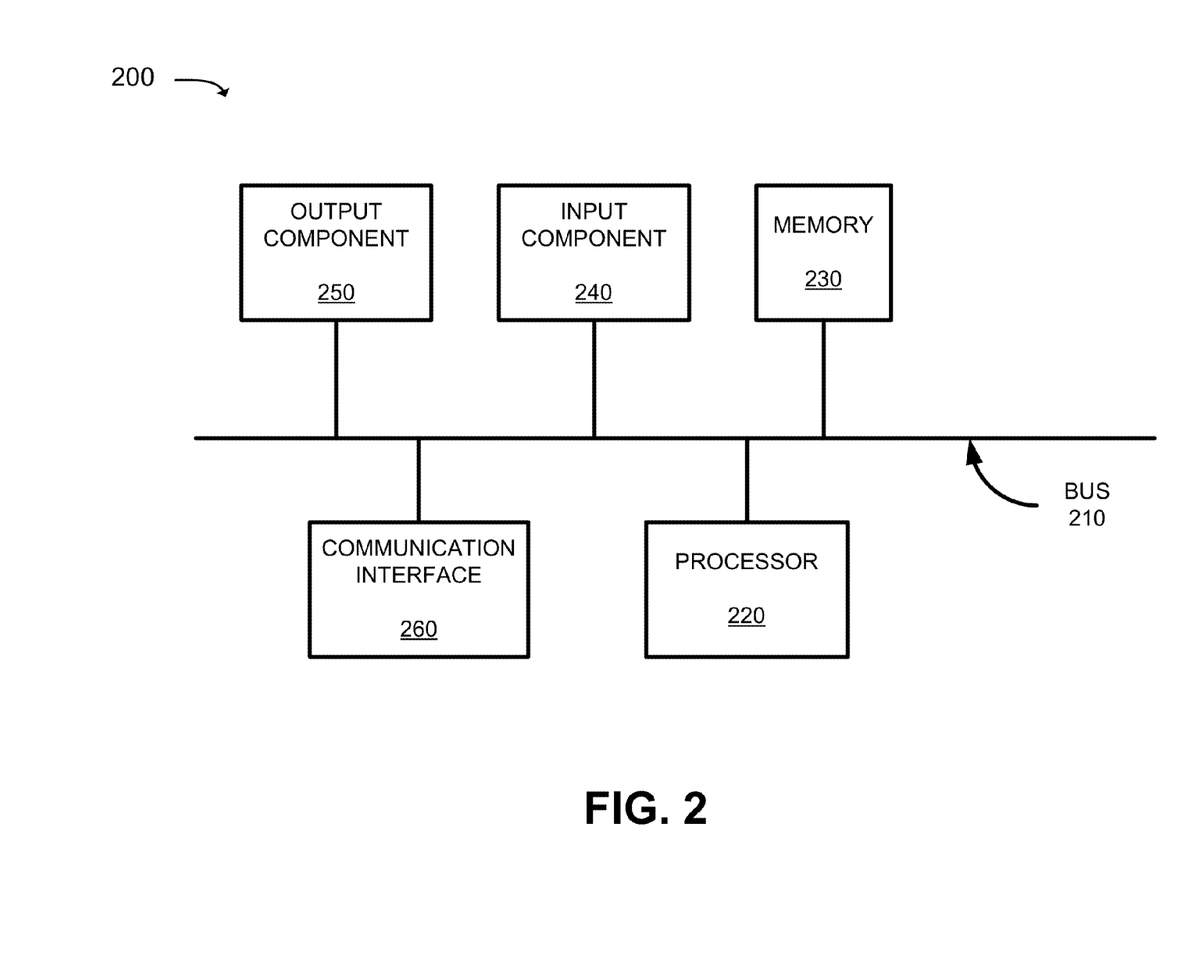
FIG. 2 is a diagram of example components of one or more of the devices depicted in FIG. 1.

FIG. 2 is a diagram of example components of a device 200 that may correspond to user device 110, client device 120, web server 130, and/or content provider 140. Alternatively, each of user device 110, client device 120, web server 130, and/or content provider 140 may include one or more devices 200 and/or one or more components of device 200. Device 200 may include a bus 210, a processor 220, a memory 230, an input component 240, an output component 250, and a communication interface 260. In another implementation, device 200 may include additional components, fewer components, different components, or differently arranged components than are shown in FIG. 2.

Bus 210 may include a path that permits communication among one or more of the components of device 200. Processor 220 may include a processor, a microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits a user to input information to device 200, such as a keyboard, a keypad, a pointing device, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems. For example, communication interface 260 may include an Ethernet interface, an optical interface, a coaxial interface, or the like.

As will be described in detail below, device 200 may perform certain operations relating to provisioning closed captioning content to user device 110. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
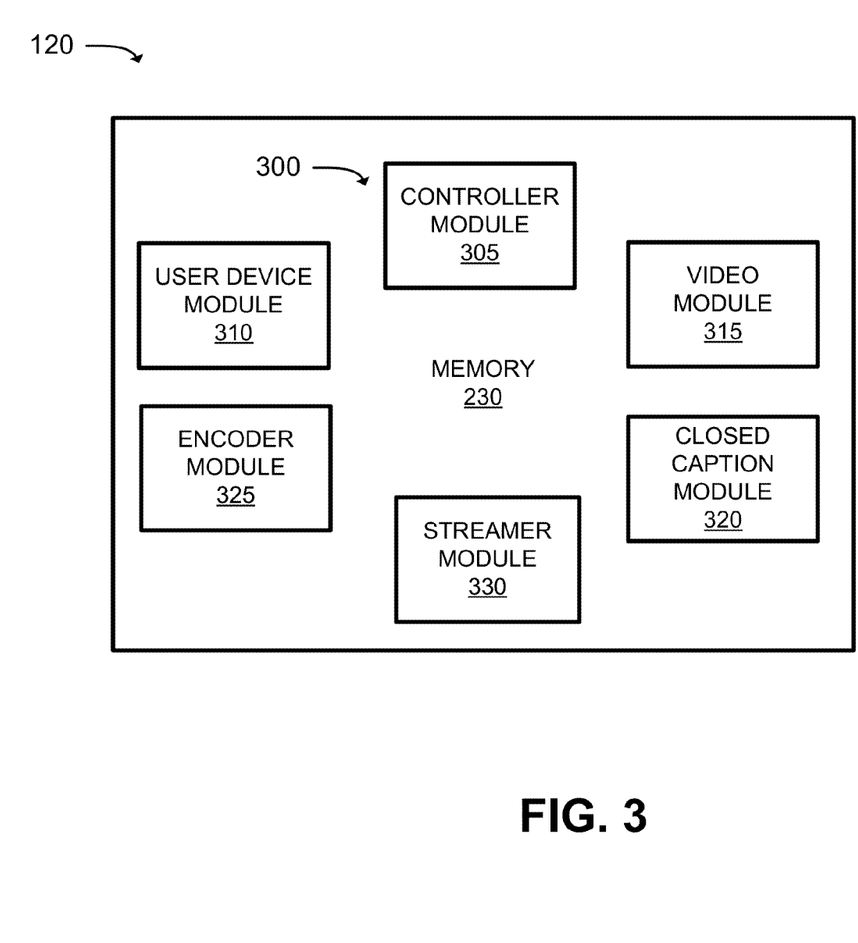
FIG. 3 is a diagram of example functional components associated with a client device of FIG. 1.

FIG. 3 is a diagram of example functional components 300 associated with client device 120. In one example implementation, the functional components described in connection with FIG. 3 may be performed by one or more components of device 200 (FIG. 2) or by one or more devices 200. As shown in FIG. 3, functional components 300 may include a collection of functional components, such as a controller module 305, a user device module 310, a video module 315, a closed caption module 320, an encoder module 325, and a streamer module 330. The quantity of functional components, included in functional components 300, is shown for explanatory purposes only. In another implementation, there may be additional functional components, fewer functional components, different functional components, or differently arranged functional components than are shown in FIG. 3.

Controller module 305 may include business logic that allows client device 120 to perform high-level management functions associated with client device 120 and/or to execute workflows associated with billing operations, receiving video content, processing video content, transmitting video content, etc. Controller module 305 may process requests for video content, closed captioning content, etc. and may instruct other functional components, based on the workflows, to perform operations that provide the video content, closed captioning content, etc. in response to the requests.

User device module 310 may, in response to an instruction from controller 305, allow client device 120 to communicate with different types of user devices 110. In an example implementation, user device module 310 may include an application programming interface (API) that allows client device 120 to interrogate user device 110 to obtain, from user device 110, information associated with user device 110, such as a type of user device 110, a unique identifier associated with user device 110, etc. The information, associated with user device 110, will be described in greater detail below with respect to FIG. 4. User device module 310 may allow client device 120 to manage and/or control video formats (e.g., motion picture experts group (MPEG)-1, MPEG-2, MPEG-3, MPEG-4, Windows Video Media (WVM), etc.), audio formats (e.g., waveform audio file format (WAV), Windows Media Audio (WMA), MPEG layer 2 (MP2), MP3, etc.), and/or other types of formats that are supported by the type of user device 110. User device module 310 may allow client device 120 to manage and/or control protocols (e.g., Internet protocol (IP), hypertext transfer protocol (HTTP), real-time streaming protocol (RTSP), progressive download protocols, adaptive bit rate streaming protocol, unicast and/or multicast protocols, IP multicast protocol, etc.) that are supported by the type of user device 110.

Video module 315 may allow client device 120 to receive and/or process video streams received from content provider 140. Video module 315 may allow client device 120 to remove video content from the video stream in a manner that allows client device 120 to process the video content for displaying on display device 125 and/or provisioning to different types of user devices 110. Closed caption module 320 may allow client device 120 to process the video streams, received from content provider 140, to remove closed captioning content from the video stream in a manner that allows client device 120 to process the closed captioning content for displaying on display device 125 and/or provisioning to different types of user devices 110.

Encoder module 325 may allow the video content and/or closed captioning content, removed from the video stream (e.g., by video module 310 and/or closed caption module 320), to be converted and/or encoded into a format that is supported by different types of user devices 110. Encoder module 325 may, for example, receive information that identifies a format that is supported by user device 110 and may convert the video content and/or the closed captioning content into a format that is supported by user device 110.

Streamer module 330 may allow the converted and/or encoded video content and/or closed captioning content to be assembled into a video stream. The assembled video stream may include packets associated with the video content as well as embedded packets, associated with the closed captioning content, that are encoded in the format that is supported by user device 110. Streamer module 330 may transmit, to user device 110, the video stream based on a protocol and/or at a data rate that is supported by user device 110. User device 110 may receive the video stream, may process the video stream to obtain the video content and/or the closed captioning content and may play the video content and the closed captioning content on user device 110.

Figure 4:
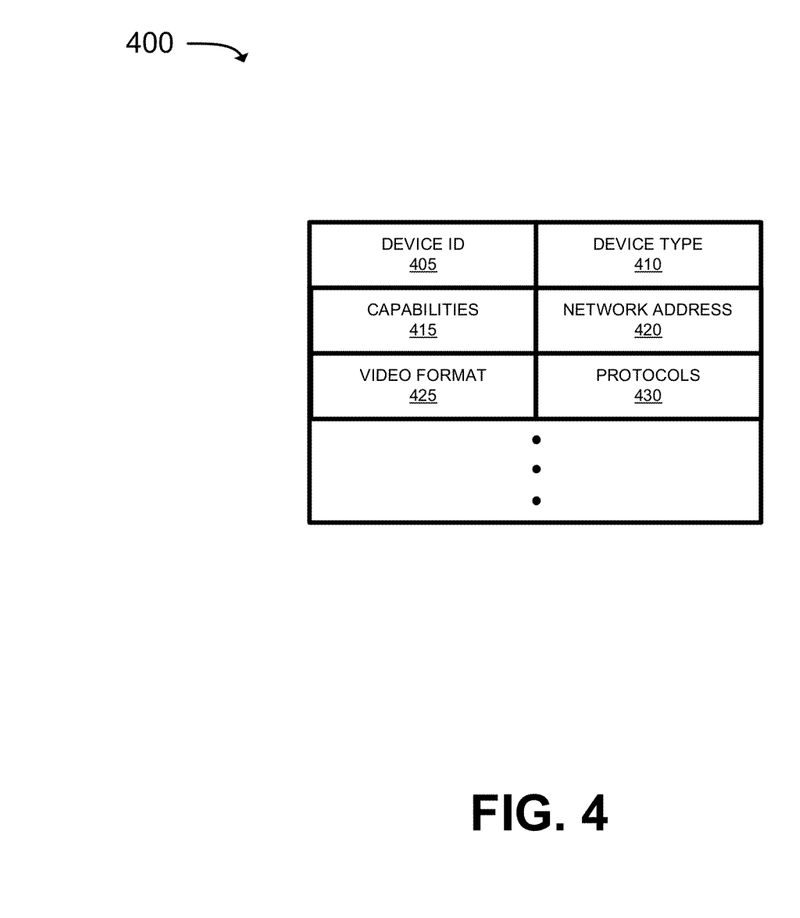
FIG. 4 is a diagram of an example data structure that stores information associated with a user device, according to an implementation described herein.

FIG. 4 is a diagram of an example data structure 400 that stores information associated with a user device, according to an implementation described herein. In one example implementation, data structure 400 may be stored in a memory associated with client device 120. As shown in FIG. 4, data structure 400 may include a collection of fields, such as a device identifier (ID) field 405, a device type field 410, a capabilities field 415, a network address field 420, a video format field 425, and a protocol field 430. The quantity of fields included in data structure 400 is provided for explanatory purposes only. In another implementation, there may be additional fields, fewer fields, different fields, or differently arranged fields than are shown in FIG. 4.

Device ID field 405 may store information that uniquely identifies a particular user device 110, such as a device identifier (e.g., a mobile directory number (MDN), a landline directory number (LDN), an electronic serial number (ESN), etc.), information associated with a user of user device 110 (e.g., a username, a password, a personal identification number (PIN), etc.), etc. Device type field 410 may store information that identifies a type of device (e.g., a laptop computer, a tablet computer, a smart phone, etc.) to which the particular user device 110 corresponds. Additionally, or alternatively, device type field 410 may store information that identifies a particular model associated with the identified type of user device 110, an operating system used by the type of user device 110, etc. Capabilities field 415 may store information that identifies capabilities associated with the particular user device 110. The capabilities may corresponds to a maximum frame rate, bandwidth, compression ratio, screen size, etc. that the particular user device 110 is capable of receiving and/or processing.

Network address field 420 may store information that identifies an address (e.g., an IP address, a media access control (MAC) address, etc.) associated with the particular user device 110. Video format field 425 may store information that identifies one or more video and/or audio formats that are supported by the particular user device 110. Protocol field 430 may store information that identifies one or more protocols that are supported by the particular user device 110 when communicating with client device 120 and/or receiving video content and/or closed captioning content.

Figure 5:
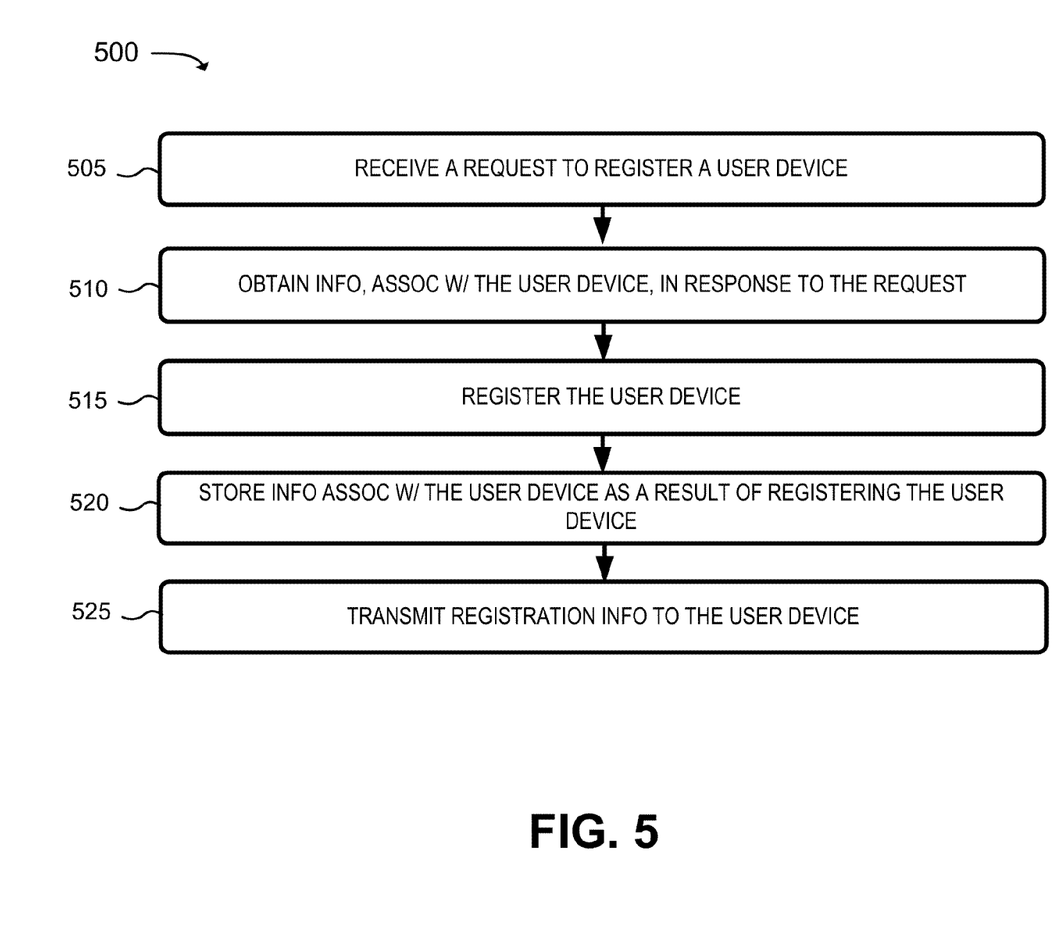
FIG. 5 is a flow chart of an example process for registering a user device, according to an implementation described herein.

FIG. 5 is a flow chart of an example process 500 for registering a user device, according to an implementation described herein. In one implementation, process 500 may be performed by client device 120. Additionally, or alternatively, some or all of process 500 may be performed by a device or collection of devices separate from, or in combination with, client device 120.

As shown in FIG. 5, process 500 may include receiving a request to register a user device (block 505) and obtaining information, associated with the user device, in response to the request (block 510). For example, a user of user device 110 may desire to register user device 110 with client device 120. The user may cause user device 110 to transmit a request to register user device 110, to client device 120, via a local area network (e.g., a Wi-Fi network, a residential-based network, etc.), a personal area network (e.g., a Bluetooth® network, etc.), and/or via network 150 (e.g., via the Internet, a service provider network, etc.).

Client device 120 may receive the request and may, in response to the request, communicate with user device 110 to obtain information associated with user device 110. In one example, client device 120 may use an API, associated with user device module 310 (FIG. 3), to communicate with user device 110 and/or to obtain the information, associated with user device 110 (e.g., such as information stored in data structure 400 of FIG. 4). Additionally, or alternatively, client device 120 may communicate with web server 130 to obtain a portion of the information, associated with user device 110, such as video formats and/or communication protocols, etc. that are supported by a type of device that corresponds to user device 110.

Additionally, or alternatively, a user, of client device 120, may use a remote control device, associated with client device 120, to instruct client device 120 to present a user interface for display on display device 125. The user interface may allow the user to use the remote control to enter information, associated with user device 110, via the user interface.

As also shown in FIG. 5, process 500 may include registering the user device (block 515), storing the information associated with the user device as a result of registering the user device (block 520), and transmitting registration information to the user device (block 525). Client device 120 may register user device 110 as a result of obtaining the information associated with user device 110 and may generate unique registration information (e.g., a confirmation number, a unique value or string, a token, etc.), associated with user device 110. Client device 120 may store, in a memory associated with client device 120, the information associated with user device 110 and/or the registration information. Client device 120 may transmit, to user device 110, the registration information so that user device 110 may communicate with client device 120 and/or may receive video content and/or closed captioning content from client device 120.

Figure 6:
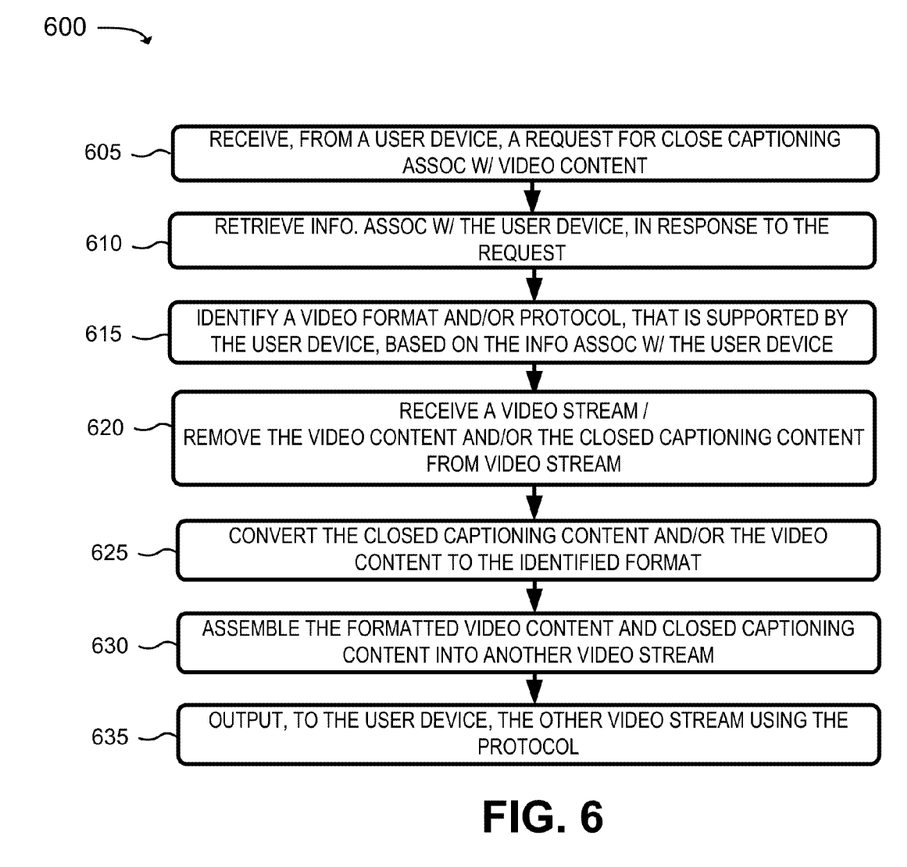
FIG. 6 is a flow chart of an example process for provisioning video content and closed captioning to a user device, according to an implementation described herein.

FIG. 6 is a flow chart of an example process for provisioning video content and closed captioning to a user device, according to an implementation described herein. In one implementation, process 600 may be performed by client device 120. Additionally, or alternatively, some or all of process 600 may be performed by a device or collection of devices separate from, or in combination with client device 120.

As shown in FIG. 6, process 600 may include receiving, from a user device, a request for closed captioning associated with video content (block 605) and retrieving information, associated with the user device, in response to the request (block 610). For example, client device 120 may receive, from user device 110, a request to receive video content with closed captioning. Client device 120 may obtain, from the request, registration information associated with user device 110 and may compare the registration information with registration information, associated with user device 110, stored in a memory associated with client device 120. Based on a determination that the registration information, obtained from the request, does not match the stored registration information, client device 120 may not provide the video content and/or the closed captioning content to user device 110. If, however, the registration information, associated with user device 110, matches the stored registration information, client device 120 may authenticate user device 110. Based on the authentication of user device 110, client device 120 may retrieve, from the memory, information associated with user device 110 (e.g., such as information stored in data structure 400 of FIG. 4).

As also shown in FIG. 6, process 600 may include identifying a video format and/or a protocol, that is supported by the user device, based on the information associated with the user device (block 615). For example, client device 120 may identify one or more formats that are supported by user device 110 based on the information associated with user device 110. The identified formats may include a variety of video formats (e.g., MPEG-1, MPEG-2, MPEG-3, MPEG-4, WVM, etc.), audio formats (e.g., WAV, WMA, MP2, MP3, etc.), and/or other types of formats.

Client device 120 may also, or alternatively, identify one or more protocols that are supported by user device 110 based on the information associated with user device 110. The identified protocols may include a variety of communication and/or video streaming protocols (e.g., IP, HTTP, RTSP, progressive download protocols, adaptive bit rate streaming protocol, unicast and/or multicast protocols, IP multicast protocol, etc.) and/or other protocols.

Client device 120 may also, or alternatively, identify one or more capabilities, associated with user device 110, such as a maximum frame rate, bandwidth, compression ratio, screen size, etc. that user device 110 is capable of receiving and/or processing.

As further shown in FIG. 6, process 600 may include receiving a video stream and removing the video content and/or the closed captioning content from the video stream (block 620). For example, client device 120 may communicate with content provider 140 to obtain a video stream that includes the video content (e.g., in a video format) and/or the closed captioning content (e.g., in a text format or some other format). In another example, client device 120 may tune to a channel on which the video stream is being transmitted to receive the video stream. Client device 120 may decode, decompress, and/or decrypt (e.g., using a compression/decompression (CODEC) component or some other component) the video content and/or closed captioning content.

Client device 120 may use video module 315 (FIG. 3) to remove packets, associated with the video content, from the video stream. Client device 120 may also, or alternatively, use closed caption module 320 (FIG. 3) to remove packets associated with the closed captioning content (e.g., in a text format and/or some other format) from the video stream. Additionally, or alternatively, client device 120 may receive the closed captioning content via a different media stream than the video stream and may remove, from the different media stream, the packets associated with the closed captioning content.

As yet further shown in FIG. 6, process 600 may include converting the video content and/or the closed captioning content to the identified format (block 625). For example, client device 120 may use encoder module 325 to convert (e.g., by transcoding, encoding, etc.) the video content and/or the closed captioning content to a format that is supported by user device 110. Client device 120 may, for example, convert the video content to a video format (e.g., MPEG-2 or some other video format) and/or audio format (e.g., MP2 or some other audio format) identified by the information associated with the user device 110. Client device 120 may also, or alternatively, process the video content to cause the video content to conform to a screen size and/or aspect ratio associated with user device 110. Client device 120 may also, or alternatively, process the video content to cause the video content to conform to a resolution level that can be displayed by user device 110.

Client device 120 may convert a same video stream into different formats for different user devices 110. Thus, the same video stream may be provided in different formats to different user devices 110.

Additionally, or alternatively, client device 120 may use encoder module 325 to convert the closed captioning content to the video format identified by the information associated with the user device 110. In one example, client device 120 may convert the closed captioning content from a text format to the identified video format (e.g., MPEG-2). Client device 120 may also, or alternatively, process the closed captioning content to cause the closed captioning content to conform to a screen size and/or aspect ratio associated with user device 110. Client device 120 may also, or alternatively, process the closed captioning content to cause the closed captioning content to conform to a resolution level that can be displayed by user device 110.

As still further shown in FIG. 6, process 600 may include assembling the formatted video content and/or closed captioning content into another video stream (block 630) and outputting, to the user device, the other video stream using the protocol (block 635). For example, client device 120 may use streamer module 330 (FIG. 3) to assemble a video stream based on packets associated with the formatted video content and/or packets associated with the formatted closed captioning content. The video stream may include the packets, associated with the formatted closed captioning content, that are embedded within frames that include the packets associated with the formatted video content.

Client device 120 may also, or alternatively, output the video stream using a protocol identified based on the information associated with user device 110. For example, client device 120 may transmit, to user device 110, the video stream using the identified protocol (e.g., RTSP or some other protocol). The video stream may be transmitted at a frame rate and/or bandwidth that conforms to a bandwidth and/or frame rate that is supported by user device 110. In another example, client device 120 may transmit (e.g., by streaming) the video stream as the video stream is being assembled (e.g., at approximately the same time and/or on a near-real time basis) from the packets associated with the formatted video content and/or the packets associated with the formatted closed captioning content. User device 110 may receive the video stream and may play the video content and/or the closed captioning content on user device 110. The closed captioning content may be displayed on user device 110 concurrently with the video content and may be updated at a rate at which the video content is updated. Embedding the closed captioning content into the video stream may allow user device 110 to display the closed captioning content without causing user device 110 and/or network hardware to be modified or replaced.

A system and/or method, described herein, may allow a client device to receive video content and closed captioning content, associated with the video content, from a content provider. The system and/or method may allow the client device to provision the video content and the closed captioning content to a user device, other than a set top box. The system and/or method may allow the client device to convert the video content and/or the closed captioning content into a video format that is supported by the user device. The system and/or method may allow the client device to provision the formatted video content and/or closed captioning content to the user device using a protocol that is supported by the user device. Provisioning the formatted video content and/or closed captioning content, to the user device, may permit the user device to receive, process, and/or play the formatted video content and/or closed captioning content without modifying and/or replacing the user device and/or network hardware.

The foregoing description provides illustration and description, but is not intended to be exhaustive or to limit the implementations to the precise form disclosed. Modifications and variations are possible in light of the above teachings or may be acquired from practice of the implementations.

While series of blocks have been described with regard to FIGS. 5 and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A device, comprising:
a memory; and
one or more processors to:
  receive a request to register a user device from an input entered by a remote control associated with the device;
  receive, at a user interface of a display associated with the device, device information via the user interface from an input entered by the remote control associated with the device, wherein the device information identifies one or more of a video format, a protocol, or a frame rate supported by a user device,
  register the user device based on the device information, wherein registering the user device includes storing registration information for the user device in a data storage associated with the device,
  transmit the registration information to the user device,
  receive, from the user device, a request for video content and closed captioning content associated with the video content, wherein the request includes the registration information,
  authenticate the user device based on the registration information,
  obtain, based on the request, a first video stream that includes the video content and the closed captioning content, where the closed captioning content in the first video stream is incapable of being played by the user device;
  convert the video content and the closed captioning content, obtained from the first video stream, to the video format identified by the device information;
  assemble a second video stream that includes the converted video content and the converted closed captioning content that conform to the video format identified by the device information;
  output, to the user device, the second video stream using the protocol identified by the device information, where the second video stream enables the user device to play the converted video content and the converted closed captioning content, and store, in the data storage associated with the device:
a device identifier associated with the user device, wherein the device identifier includes at least one of a mobile directory number, a landline directory number, or an electronic serial number, and
at least one of a username, a password or a personal identification number associated with a user of the user device.

2. The device of claim 1, where the video content obtained from the first video stream conforms to a video format that is different than the video format identified by the device information.

3. The device of claim 1, where the closed captioning content, obtained from the first video stream is associated with a text format.

4. The device of claim 1, where, when obtaining the first video stream, the one or more processors are further to:
communicate directly with a content provider to obtain the first video stream, or
tune to a channel on which the first video stream is being broadcast by the content provider.

5. The device of claim 1, where the one or more processors are further to:
remove first packets, associated with the video content, from the first video stream, and
remove second packets, associated with the closed captioning content, from the first video stream.

6. The device of claim 1, where, when outputting the second video stream, the one or more processors are further to:
transmit, to the user device, the second video stream:
on a near-real time basis as the second video stream is being assembled, and
at a frame rate identified by the device information.

7. The device of claim 1, where the one or more processors are further to:
obtain, from the user device, the device information in response to the request to register, and
store the device information in the memory.

8. The device of claim 5, where, when converting the video content and the closed captioning content, the one or more processors are further to:
convert the first packets from a first video format to the video format identified by the device information, where converting the first packets enables the converted video content to:
conform to a screen size identified by the device information, or
conform to a resolution level identified by the device information.

9. The device of claim 5, where, when converting the video content and the closed captioning content, the one or more processors are further to:
convert the second packets from a text format to the video format identified by the device information, where converting the second packets enables the converted closed captioning content to be:
embedded within frames, associated with the second video stream, that include the first packets, and
played on the user device without modifying the user device.

10. The device of claim 5, where, when assembling the second video stream, the one or more processors are further to:
embed a respective set of the first packets and the second packets within each frame associated with the second video stream.

11. A method, comprising:
receiving, by a set top box, a request to register a first user device of one or more user devices from an input entered by a remote control associated with the set top box device;
providing a user interface on a display associated with the set top box;
receiving, from the input entered by the remote control, information associated with the first user device via the user interface;
registering the first user device based on the information associated with the first user device, wherein registering the first user device includes storing registration information for the first user device in a data storage associated with the set top box,
transmitting registration information to the first user device;
receiving, by the set top box, a request to provision video content and closed captioning content, associated with the video content, to the first user device, wherein the request includes the registration information;
authenticating the first user device based on the registration information;
retrieving from the first user device, first device information that identifies a first video format and a first protocol that is supported by the first user device;
obtaining, by the set top box, second device information, associated with a second user device of the one or more user devices, where:
the second device information identifies a second video format and a second protocol that is supported by the second user device;
obtaining, by the set top box, a first video stream that includes the video content and the closed captioning content;
converting, by the set top box, the video content and the closed captioning content, to the first video format and the second video format;
creating, by the set top box, a second video stream that includes the video content and the closed captioning content that conform to the first video format;
creating, by the set top box, a third video stream that includes the video content and the closed captioning content that conform to the second video format;
outputting, to the first user device, the second video stream using the first protocol;
outputting, to the second user device, the third video stream using the second protocol, and
store, in the data storage associated with the set top box:
a device identifier associated with the first user device, wherein the device identifier includes at least one of a mobile directory number, a landline directory number, or an electronic serial number, and
at least one of a username, a password or a personal identification number associated with a user of the first user device.

12. The method of claim 11, where the first user device is a different type of user device than the second user device, and where the first user device and the second user device are different types of user devices than a set top box.

13. The method of claim 11, where obtaining the first video stream further includes:
decrypting the first video stream to enable the video content or the closed captioning content to be removed from the first video stream.

14. The method of claim 11, further comprising:
extracting, from the first video stream, first packets associated with the video content and second packets, associated with textual content, that correspond to the closed captioning content.

15. One or more non transitory computer-readable media, comprising:
one or more instructions, which when executed by at least one processor, cause the at least one processor to:
receive, at a set top box, a request to register a user device from an input entered by a remote control associated with the set top box device;
provide a user interface on a display associated with the set top box;
receive information associated with the user device via the user interface;
register the user device based on the information associated with the user device, wherein registering the user device includes storing registration information for the user device in a data storage associated with the set top box;
transmit registration information to the user device;
receive, from the user device, a request for video content and closed captioning content associated with the video content, wherein the closed captioning content is incapable of being played by the user device and wherein the request includes the registration information;
authenticate the user device based on the registration information;
obtain, based on the request, device information, associated with the user device, that identifies a first video format that is supported by the user device;
obtain the video content and the closed captioning content, where the video content conforms to a second video format, and
where the closed captioning content conforms to a text format;
convert the video content from the second video format to the first video format and the closed captioning content from the text format to the first video format;
transmit the converted video content and the converted closed captioning content to the user device, where the converted video content and the converted closed captioning content enable the user device to play the converted video content and the converted closed captioning content on the user device without modifying the user device, and
store, in the data storage associated with the set top box:
a device identifier associated with the user device, wherein the device identifier includes at least one of a mobile directory number, a landline directory number, or an electronic serial number, and
at least one of a username, a password or a personal identification number associated with a user of the user device.

16. The one or more non transitory computer-readable media of claim 15, where the device information identifies at least one of:
a protocol that specifies a manner in which the converted video content and the converted closed captioning content is to be transmitted to the user device,
a maximum frame rate that can be received or processed by the user device,
a compression ratio that is supported by the user device,
a screen size or aspect ratio associated with the user device,
a type of device to which the user device corresponds, or
a network address associated with the user device.

17. The one or more non transitory computer-readable media of claim 15, further comprising:
one or more instructions, which when executed by at least one processor, cause the at least one processor to:
obtain a video stream that includes first packets associated with the video content and second packets associated with the closed captioning content; and
remove, from the video stream, the first packets and the second packets.

18. The one or more non transitory computer-readable media of claim 15, further comprising:
one or more instructions, which when executed by at least one processor, cause the at least one processor to:
generate a video stream that includes first packets associated with the converted video content and second packets associated with the converted closed captioning content, where:
the video stream includes a plurality of frames of packets, and
one or more frames, of the plurality of frames of packets, include at least one of the first packets and at least one of the second packets.

19. The one or more non transitory computer-readable media of claim 16, where the protocol corresponds to at least one of:
a progressive download protocol,
an adaptive bit rate streaming protocol,
an Internet protocol (IP)-based protocol,
a hypertext transfer protocol (HTTP),
a real-time streaming protocol (RTSP),
a multicast protocol, or
an IP multicast protocol.

* * * * *